United States Patent [19]
Blair

[11] 3,779,210
[45] Dec. 18, 1973

[54] INCUBATIVE ANIMAL CONFINEMENT SYSTEM

[75] Inventor: Bruce A. Blair, Winnetka, Ill.

[73] Assignee: International Farm Systems, Inc., Streator, Ill.

[22] Filed: Apr. 5, 1972

[21] Appl. No.: 241,338

[52] U.S. Cl. .................... 119/18, 119/22, 119/71
[51] Int. Cl. .............................................. A01k 01/02
[58] Field of Search .............. 119/18, 15, 17, 22, 119/71

[56] References Cited
UNITED STATES PATENTS
| | | |
|---|---|---|
| 3,664,302 | 5/1972 | Wienert .............................. 119/18 |
| 3,464,388 | 9/1969 | Stout ................................. 119/15 |
| 3,604,398 | 9/1971 | Peardon ........................... 119/18 X |

Primary Examiner—Hugh R. Chamblee
Attorney—Robert D. Spille et al.

[57] ABSTRACT

An incubator for young animals is provided and includes a plurality of modular animal confinement pens. Each of the modular pens includes a flooring of an open-mesh grill work to allow animal waste to fall through to a collecting trough where it can be flushed away and each pen is provided with feed supply means which is readily accessible to the animal confined therein connected to a precisely measured source of nourishment, such as milk, which is automatically and periodically replenished from a central source of supply. Means are provided to maintain an overpressure and a flow of conditional air through the pens and each pen is supplied with heating means to maintain a warm temperature for the animal therein.

13 Claims, 8 Drawing Figures

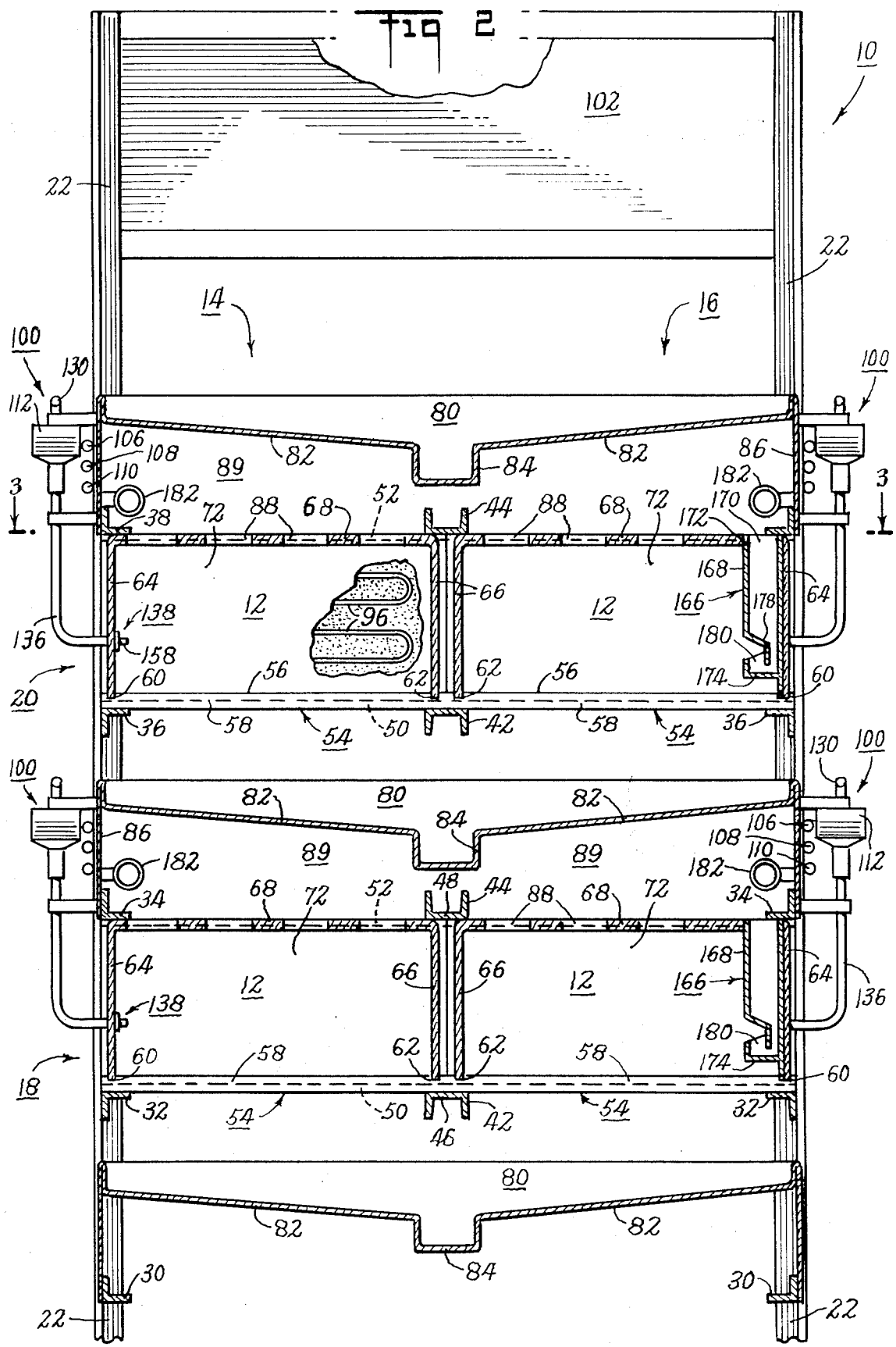

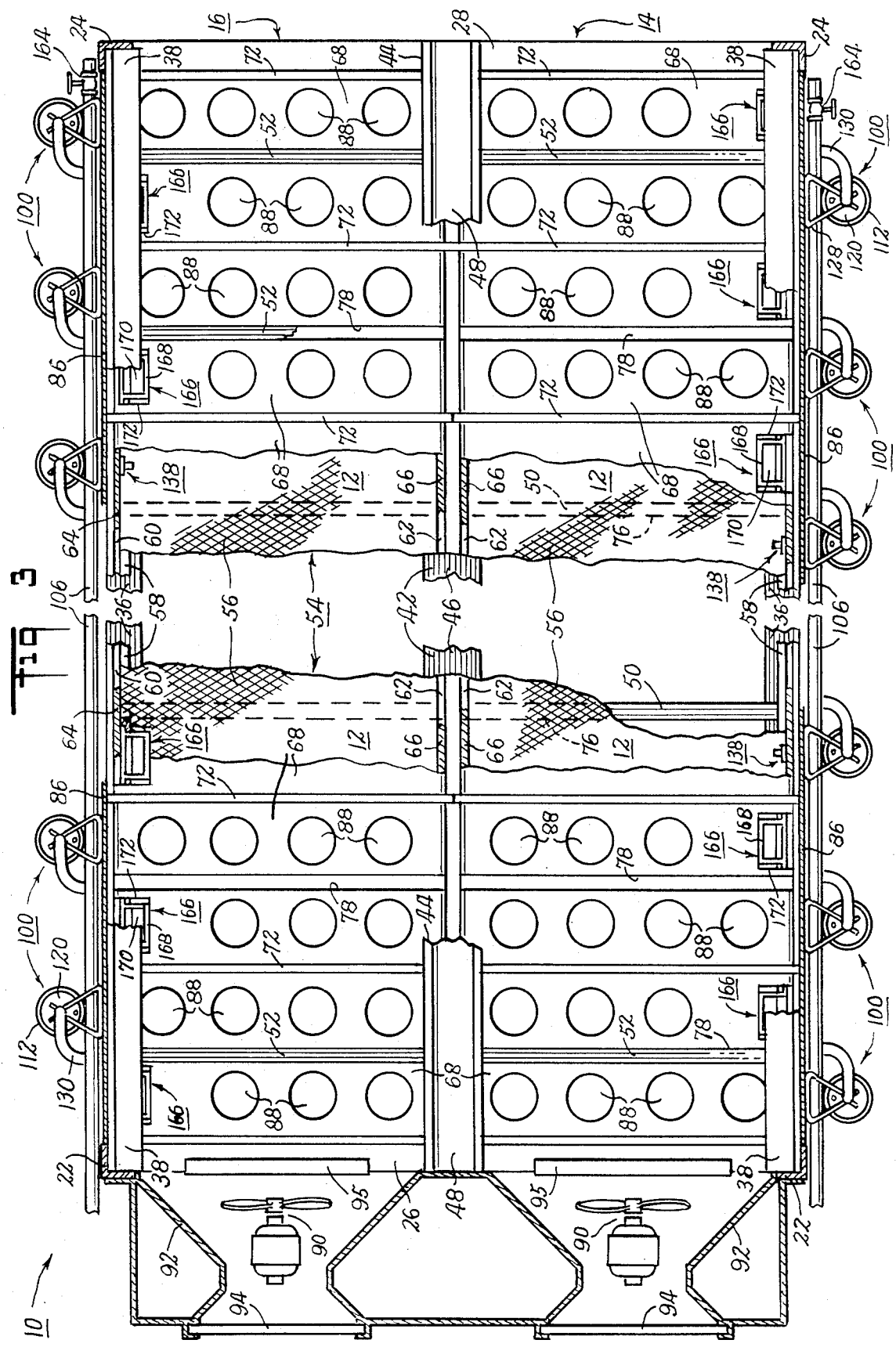

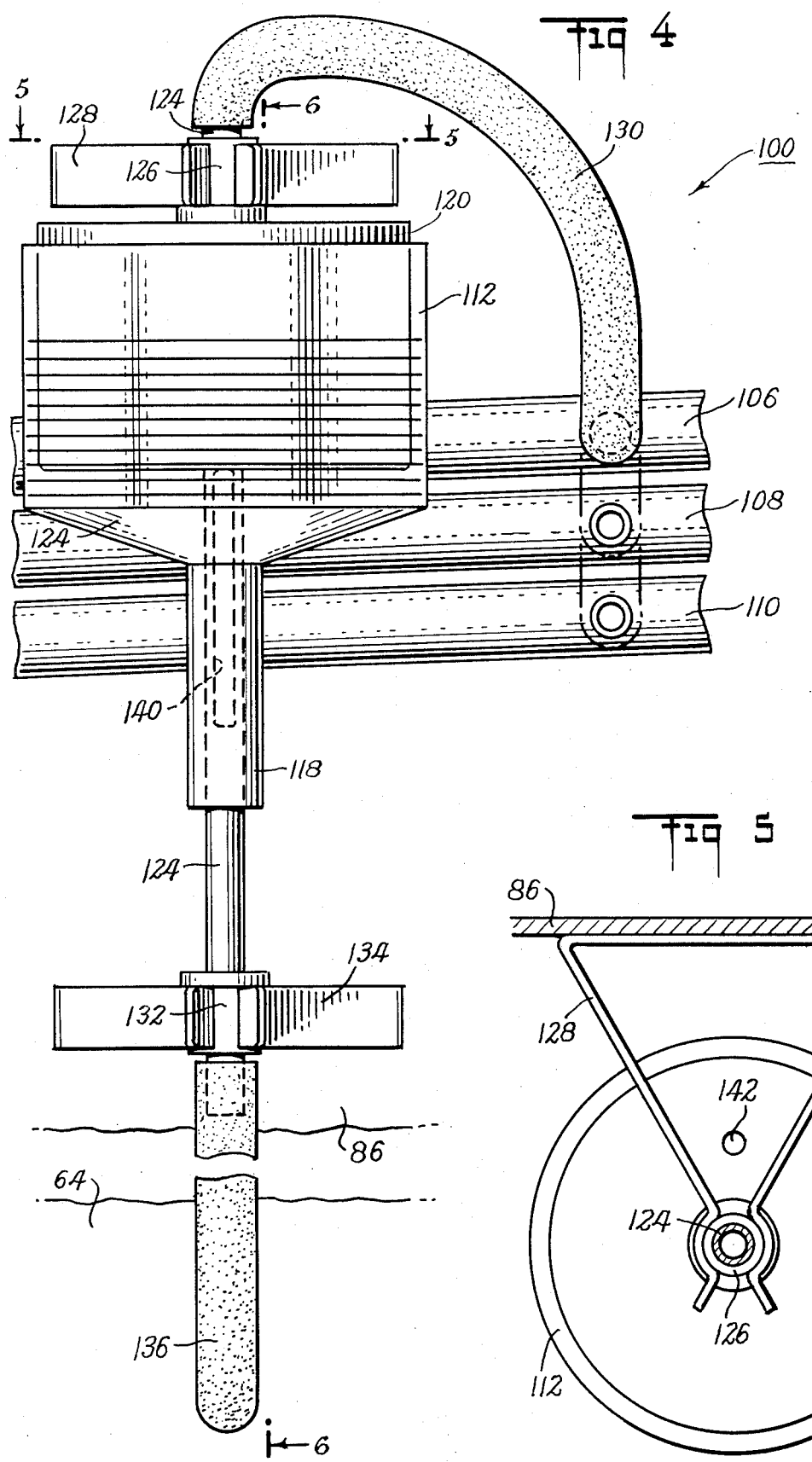

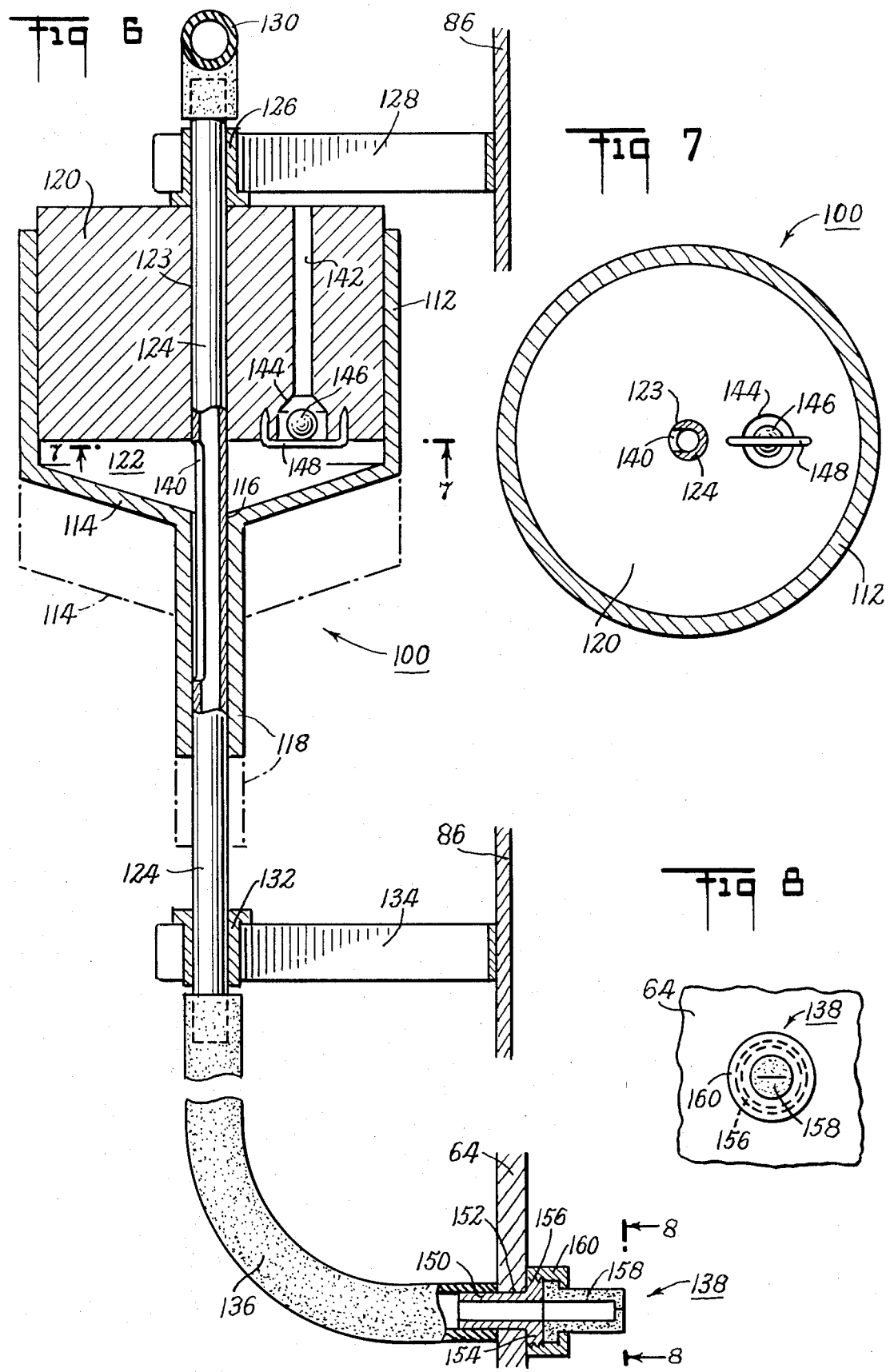

INCUBATIVE ANIMAL CONFINEMENT SYSTEM

The present invention relates to animal confinement pens and more in particular to incubating animal confinement pens to house young animals from birth until they are able to be placed in normal confinement or other housing means.

In raising animals, for example pigs, on a commercial basis for subsequent slaughter and sale, it is imperative in order to maximize the profitability of the operation to insure that no needless loss of animals occurs after farrowing. When a sow is left to her own devices to care for her litter of pigs after farrowing there is an inordinately high incidence of piglet deaths for one reason or another. Among these reasons are the lack of sufficient nursing nipples for the litter because litter size exceeds nursing ability of the sow so that certain of the pigs of the litter do not get sufficient nourishment and then starve, weak pigs may be denied nourishment by the stronger pigs, or the sow steps or lays upon one of the pigs and crushes it, or in some instances the sow's milk is infected or deficient so as to be harmful and detrimental to the well being of the young pigs.

In an attempt to minimize the loss of young pigs because of the sow accidentally stepping or laying upon the pigs some pig producers provide an enclosure to house the sow centrally within a pin to prevent the sow from freely moving about. This confinement device is an upstanding cage in which the sow is housed and permits access to the sow's udders by the young pigs for feeding. But, this device does not alleviate the problems of the weaker pig of the litter, insufficient food supply or the problem of deficient or infected milk from the sow.

Attempts have been made to provide the maintenance of young pigs away from the sow but these attempts have conventionally provided a total system approach where all the young pigs are subjected to the same environment. This approach has inherent problems such as difficulty to maintain cleanliness, difficulty in controlling the environment around the young pigs and the transfer of disease between pigs in the common environment.

Accordingly, it is an object of the present invention to provide an incubative animal confinement system to house and maintain animals such as pigs from about the time that they are farrowed until they are weaned and have attained a sufficient stage of development so that they may be confined with other pigs in a conventional animal confinement pen or other housing means.

It is another object of the present invention to provide such an incubative confinement system which maintains the young pigs in a healthful and sanitary environment and which is able to provide the pigs with a sufficient nutritive food source.

It is a further object of the present invention to provide such an incubative confinement system wherein the animals confined therein can feed at will from a predetermined volumetric quantity of a liquid nutritive substance which is dispensed automatically to each of a plurality of separate confinement pens.

Yet another object of the present invention is to provide an incubative animal confinement system of the character described which additionally may be utilized to confine older animals and is provided with means to dispense dry feed within each confinement pen.

A still further object of the present invention is to provide incubative animal confinement pens which are economical to maintain, are easy to disassemble for cleaning without disturbing adjacent confinement units, are adjustable in size to accommodate a number of animals and which can economically house a large number of young pigs in various stages of development.

Still another object of the present invention is to provide an incubative animal confinement system which provides modular confinement units for each animal wherein each confinement unit is individually controlled to maintain proper temperature conditions and is provided with an individually controlled food supply.

A further object of the present invention is to provide such incubative animal confinement system which is free standing in any enclosed room and wherein only the environment within the incubative system need be controlled so as to preclude the necessity to environmentally control a large room.

In a preferred embodiment of the present invention, the individual animal confinement pens are arranged in a bank of two rows comprising two or more tiers. The pens are separated from each other by removable panel members containing heating coils therein to warm the pens to the desired temperature level and the flooring in each of the pens comprises an open-mesh grill work to allow waste products from the pigs to fall therethrough to a collecting trough which may be conveniently flushed. Ambient air, which may be prewarmed before it enters the pen, is continuously circulated uniformly through each of the confinement pens by fans which force air through a plenum chamber above the confinement pens and then through openings in the panels defining the tops of the pens to provide an overpressure for each pen. Each pen is also provided with a suitable nipple disposed through the outside wall of the pen which is operatively connected by a tube to a suitable vessel where a nutritive liquid feed substance, such as fortified powdered milk may be stored. The vessel is provided with means to change its internal volume to accommodate an increasing liquid ration for the pigs as they grow and each of the separate vessels are connected by appropriate tubing to a single source of supply. Periodically, the separate vessels are filled to their appropriate volume automatically from the central source of supply to allow the individual pigs within the separate confinement pens to receive their feed ration on demand. The pens are also provided with a suitable feed trough whereby dry feed material can be maintained.

In the drawings:

FIG. 2 is a vertical, sectional view taken on the line 2—2 of FIG. 1;

FIG. 3 is a horizontal sectional view taken on the line 3—3 of FIG. 2;

FIG. 4 is an elevational view showing details of construction of the liquid feed storage vessel;

FIG. 5 is a sectional view taken on the line 5—5 of FIG. 4;

FIG. 6 is a vertical, sectional view taken on the line 6—6 of FIG. 5 showing details of the means to volumetrically control the capacity of the liquid feed vessel;

FIG. 7 is a sectional view taken on the line 7—7 of FIG. 6; and

FIG. 8 is an elevational view taken on the line 8—8 of FIG. 6.

Figure 1:
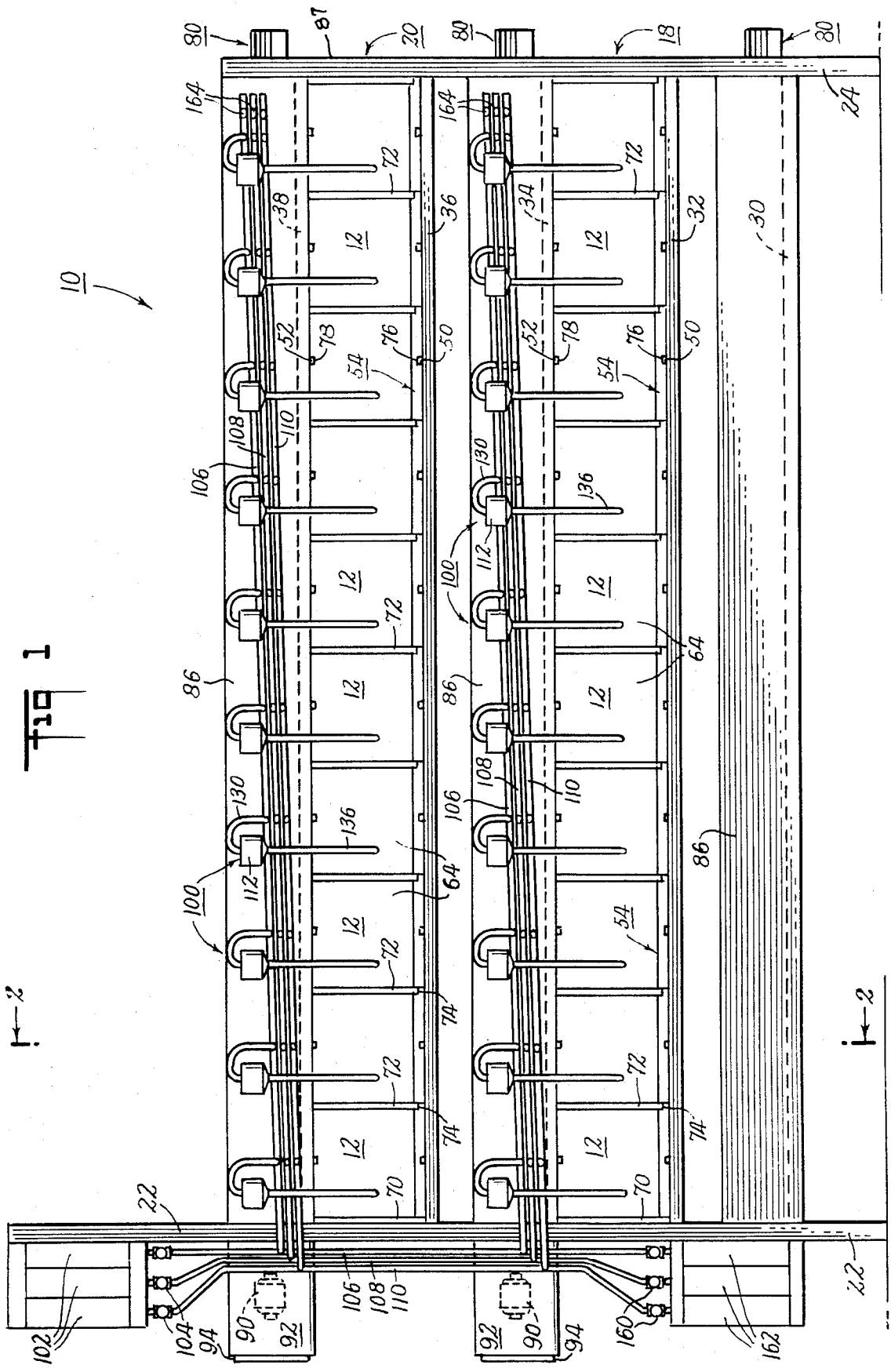
FIG. 1 is a side elevational view showing the incubative confinement system of the present invention.

With reference to the drawings and particularly FIGS. 1–3, the incubative confinement system 10 of the present invention includes a plurality of modular animal confinement pens 12 preferably arranged in a pair of side-by-side rows 14 and 16 and also preferably arranged in a plurality of tiers 18 and 20. For purposes of description in this specification, a system will be described having two tiers of two rows each but it is to be understood that any number of tiers may be provided if so desired.

The incubative system of the present invention includes a supporting structure comprising a pair of forward vertically disposed support members 22, which are preferably angle iron steel members and a pair of similar rearward vertical support members 24. Vertical supports 22 are interconnected by a plurality of spaced horizontally disposed cross brace members 26, which are also preferably angle iron, and in like manner vertical support members 24 are interconnected by similar horizontally disposed cross brace members 28. Opposed pairs of longitudinally disposed vertically spaced angle iron stringers 30, 32, 34, 36, and 38, respectively, are also provided to connect the forward vertical support members 22 and the rear support members 24. Additionally, for each tier of the structure a pair of centrally disposed U-shaped support stringers 42 and 44 are also provided with the bight segments 46 and 48, respectively, facing each other.

To add further structural rigidity to the animal incubative system and also to provide a guide track on the top and bottom for each modular confinement pen a plurality of horizontal cross braces are provided for each tier. Thus, for each tier 18 and 20 a plurality of lower cross brace members 50, which span between the longitudinal stringers 32, and upper cross brace member 52, which span the longitudinal stringers 34, are provided. In like manner, for upper tier 20, lower cross brace members 50 span the longitudinal stringers 36 and upper cross brace members 52 span longitudinal stringers 38.

Each of the modular animal confinement stalls or pens 12 comprises a floor section 54 which includes a floor plate member 56 of an open-mesh grill work construction, preferably of extruded plastic, integral with a rectangularly shaped frame work 58. The opposed lateral edges of frame work 58 include channel shaped recesses 60 and 62, respectively, to accommodate the lower surface of opposed side wall segments 64 and 66, respectively, of the modular confinement pen. The side walls of the pen 64 and 66 are preferably of clear plastic and are formed integral with the top wall segment 68. Thus, the side walls 64 and 66 and the top wall 68 are formed from a single sheet of clear plastic and are appropriately formed into a U-shaped segment as best seen in FIG. 2, with the lower edges of the side walls 64 and 66 fixed within the recesses 60 and 62 in any suitable manner.

An end wall 70 is provided for the forwardmost modular confinement pen 12 in each tier with the end wall 70 being suitably affixed to the supporting framework in any convenient manner. Each of the modular confinement units 12 is provided with an end wall 72 which is secured in any convenient manner to an undercut ledge 74 in the upper surface of floor panel 54. Thus, each modular confinement unit 12 includes a flooring section 54, side walls 64 and 66, a top wall 68 and an end wall 72 which serves as a common end wall for the next adjacent modular confinement pen.

Each end wall 72 is slidably disposed within and removable from the confinement system 10 and may be readily removed by sliding the end wall along the ledge 74. Thus the individual pens may be increased in size up to the entire length of the system. The ability to vary the pen size permits grouping pigs according to size, age, litter origin or any other desired classification when desired. This is beneficial after the pigs are older because pigs are by nature social animals and thrive best in the company of their litter mates. Thus removing some of the end walls 72 at later stages of the incubative period will provide an environment and feeding system similar to that provided by the sow.

On the undersurface of frame work 58 cutouts 76 are provided to accommodate cross brace members 50 and a similar cutout section 78 in top wall 68 accommodates cross brace members 52. Each modular confinement unit 12 is slidably disposed along the cross brace members 50 and 52 and the cross brace members serve as guide tracks to allow the modular confinement units to be withdrawn from the structure, much like a drawer, in order to allow an animal to be placed or removed from the unit and to allow the units to be individually cleaned.

The floor plate 56 of each modular confinement unit is of an open-mesh grill work construction to allow the animal's waste products to fall or be pressed therethrough. Accordingly, waste collection means are provided below the floor section of the animal confinement units in each tier in order to collect and remove animal waste products. Thus, below each tier 18 and 20, a waste collection through system 80 is provided. To allow ready addition of additional tiers, if desired, and to form the air plenum over the upper tier of pens, the same trough system 80 is provided over the uppermost tier 20. Thus the same trough means provides for animal waste collection on its upper surface and an air channel and plenum on its lower surface to transmit and circulate air uniformly to animals below.

The waste collection trough system 80 is preferably constructed from a unitary section of sheet metal to have pan sections 82 located beneath the open-mesh grill work flooring 56 of the modular confinement units with the pan sections sloped inwardly toward a central collection trough 84 which is formed integral with the trough system 80. As best seen in FIG. 1, the trough system 80 is inclined along the structure 10 so that the waste material can be flushed from the pans 82 to the central trough 84 and then down the trough 84 to be collected at one end of the structure.

Side plate members 86 are also provided to cover the exposed lateral surfaces of the structure 10 between tiers and advantageously the side plates 87 are an extension of the sheet metal used to form the collection trough 80. Thus, the sheet metal of the trough system 80 is formed over to provide vertically disposed side plates between tiers of the structure. In this manner, the trough can be fixed within the structure 10 by suitably fixing the sheet metal side plates 86 to respective longitudinal stringers 30–38.

The environment within the confinement pens 12 can be controlled by circulating air through the units and by controlling the temperature of each of the modular confinement pens. To this end, the top wall 68 of each modular confinement pen 12 is provided with a plurality of air access passages such as holes 88 through which air may be circulated.

The lower surface of the trough system 80 immediately above a tier 18 or 20, the side plate members 86, end plate member 87 and the top walls of the individual modular confinement pens defines a plenum chamber 89 through which air may be circulated into each of the pens through the air access passages 88. Circulation of the air is accomplished by air fans 90 mounted within an air inlet housing 92 on the forward end of the structure. The air inlet housings 92 are in communication with the plenums 89 and draw air through air filter screens 94 within the air inlet housing 92 for circulation through the plenum and into the modular confinement pens. Heaters 95 may be provided in housing 92 to prewarm the air.

The air inlet housing 92 is preferably of sheet metal and may be formed in any conventional manner and fixed to the confinement system 10 to assure that air drawn into the system is first filtered by the air filters 94.

Air forced into plenum 89 will reach a uniform pressure within the plenum chamber and will then be distributed uniformly into each pen through air access passages 88. The air circulates through the pen and exits through the open grill work flooring and out of the structure. The air circulation pattern thus creates an overpressure in each individual pen of prewarmed clean air. This design affords each animal its own independent air supply precluding transmission of germs from one animal to another as the overpressurization prevents air flow up through the open flooring and the intermixing of air from one pen to another.

The end panels 72 of each animal confinement unit are preferably formed of a plastic material such as Bakelite and have embedded therein electrical heating wires 96 connected to a suitable supply of electrical energy (not shown) which may be responsive to a thermostatic setting to maintain the interior of each modular unit at a desired temperature for each animal no matter what age. Thus the system could maintain the temperature of 75° F. needed for older animals and between 90° and 95° F. needed for new born animals by individual temperature adjustments.

An essential feature of an incubative confinement system is the provision of sufficient feed in proper proportion to the animals confined therein. Accordingly, each animal confinement pen 12 is provided with means to feed the animal confined therein with the proper type and quantity of feed for the particular stage of development of the animal. With reference now to FIGS. 4–8 as well, it is seen that each animal confinement pen is provided with a liquid feed apparatus 100 with provision within each pen for the animal to feed at will on demand. Each of the separate feed apparatus 100 receive a supply of liquid feed, such as a fortified milk formula from one of a plurality of central storage vats 102 where the milk can be mixed for example by adding water to powdered milk and supplementing the formula by appropriate vitamins and minerals or other ingredients. The liquid formula is directed through appropriate valves 104 to one of three distribution lines 106, 108 and 110 mounted along side plates 86 and which may be selectively placed in fluid communication with each of the individual feeding apparatus 100.

Each feeding apparatus 100 comprises a fluid containing vessel 112 open at its upper end and having a conically shaped bottom portion 114 with a centrally disposed access port 116 therein communicating with a tubular segment 118 which preferably is formed integral with the bottom portion 114 of the vessel.

A cylindrical plug segment 120 is disposed within the vessel 112 and vessel 112 is selectively positioned with respect to the vessel plug 120, as more fully described hereinafter, to provide a suitable liquid storage volume 122 defined by the lower surface of the plug 120 and the conically shaped lower portion 114 of the vessel 112.

Plug 120 is provided with a through bore 123 and a fluid delivery tube 124 is disposed within through bore 123 of plug 120 and preferably is rigidly affixed to plug 120. The upper end of delivery tube 124 is disposed within a bushing 126 in a bracket support 128 which is in turn affixed to side wall 86 and the upper open end of delivery tube 124 is telescoped within a flexible tube member 130 which may be selectively placed in fluid communication with one of the liquid delivery tubes 106, 108 or 110 to allow for fluid communication from one of the delivery tubes to tube 124. The system is adaptable in that each delivery tube may communicate with a separate central vat to provide a different ration for animals of different ages. Any liquid delivery tubes not in communication with the central supply will be suitably capped to eliminate spillage.

In like manner, the lower end of delivery tube 124 is mounted within a bushing 132 in a bracket 134 also secured to side wall 86 and the lower end of delivery tube 124 is telescoped within a flexible tube member 136 which affords fluid communication from the delivery tube 124 to a nipple assembly 138 mounted within the side wall 64 of an individual confinement pen 12.

Intermediate its ends, delivery tube 124 is provided with a fluid access slot 140 positioned so that a portion of the access slot 140 is always disposed within the liquid storage volume 122 of vessel 112. Plug 120 is also provided with a vent opening 142 which is provided with a countersunk segment 144 within which is freely supported a spherical member 146 retained within the countersunk segment by any suitable means such as a staple member 148. The spherical member 144 is of a lightweight material so as to float and when the milk formula or any other liquid is injected into the liquid storage 122 and as the liquid level rises within the countersunk segment 144, spherical member 144 will be driven into the air access passage 142 to prevent overflow of liquid out of vessel 112.

Float member 146 also permits air to enter above the declining liquid level in vessel 112 to pressurize the vessel to provide an even flow of liquid through the nipple. Thus no interruption of an animal's suckling is necessary for air entry or burping.

Vessel 112 is vertically movable with respect to the plug 120, as shown in broken line in FIG. 6, and the vertical position of vessel 112 with respect to plug 120 varies the volume of liquid storage 122 so that the volume of liquid feed with any individual container may be varied depending upon the feeding requirements of the animals within a particular confinement pen. Thus with the vessel 112 in the lowermost position, as shown in broken line in FIG. 6, the volume 112 will be greater than when the vessel is in the position shown in full line.

The volume of feed in vessel 112 can be varied according to the requirement of an animal confined in an individual pen as determined by its age and this variation of feed supply is necessary because a young animal, such as a pig, especially in its first few days of life, may overeat and die from digestive upset.

While the vessel 12 is vertically movable with respect to delivery tube 124 and plug 120 it is of course to be understood that suitable cooperative means between the vessel 112 and plug 120 should be employed to prevent undesired variation in the liquid volume capacity of the feeder. Accordingly, a slight press fit is preferably utilized between vessel 112 and plug 120 or vessel 112 may be provided with an internal thread configuration to mate with an external thread configuration on plug 120 so that volume variations may be readily made by rotating vessel 112 with respect to the plug 120 and tube 124.

As best seen in FIG. 6, the nipple assembly through side wall 64 of a confinement pen 12 includes an annular bushing 150 fastened within a receiving bore 152 in side wall 64. Flexible tube 136 telescopes over the outer exposed segment of bushing 150 and the inner segment of bushing 150 includes a collar segment 154 provided with an external thread configuration 156. A conventional nipple 158 held within an internally threaded retaining ring 160 is cooperatively placed about the threaded collar 154 and is disposed within the confinement pen 12 so as to be available to an animal confined therein.

At predetermined intervals, the milk formula is prepared in central storage vat 102 and distributed by gravity through valves 104 to one of the distribution lines 106, 108 or 110 to the individual vessels 112. Vessel 112 associated with a particular confinement pen has its liquid storage volume 122 set according to the requirements of the animal in the pen and the volume 122 fills until the spherical number 146 seats within counterbore 144 to shut off air access port 142 and the filling of volume 122 is accomplished with virtually no noise so as to not disturb the animals within the pens.

When the time has elapsed for all vessels to fill, the appropriate valve 140 is disconnected from the distribution system so no further milk formula is distributed through the system. Animals confined within the individual pens may now feed "on demand" until the predetermined volume of formula within storage volume 122 is consumed.

Almost simultaneously with the closing of the appropriate valve 104, one of a plurality of valves 160 associated with lines 106, 108 and 110, respectively, open to allow lines 106, 108 and 110 to drain clear of residual feed into one of a plurality of collecting vats 162. Check valves 164 are also provided at the opposite ends of each delivery line 106, 108 and 110 and are appropriately controlled to open to admit air into lines 106, 108 and 110 to assist in complete drainage.

Slot 140 within delivery tube 124 has a length, and is positioned relative to vessel 122, so that a segment of the slot is always contained within the liquid storage volume 122 as the position of vessel 112 is changed between maximum volume position and minimum volume position. When storage volume 122 is maintained at a minimum volume, the tubular extension 118 of the lower portion 114 surrounds slot 140 to preclude undesired leakage of liquid.

Distribution lines 106, 108 and 110 may also be connected as desired, to a source of drinking water and also to a source of water under pressure to flush out the system. Water may periodically be sprayed through trough system 80 to wash the troughs and flush away the waste products.

Additionally, it is desirable to provide means within the liquid feed distribution system, for example in the central storage vats 102 or the individual vessels 112 to sterilize, i.e., pasteurize, the milk formula, to insure a healthful supply of formula for the young pigs.

Each of the confinement pens 12 are also provided with dry feed systems 166 to supply animals confined within the pens 12 with dry grain feed when they have matured to a sufficient stage.

The feed systems 166 are formed of plastic and include a vertically disposed rectangular cross-sectional bin 168 disposed along the side wall 64 of a confinement pen having an open top 170 in register with a rectangular opening 172 within top wall 68 of confinement pen 12. The bottom of bin 168 is closed by a wall 174 spaced above the floor 56 of the pen and the wall of bin 166 projects from the bottom of bin 168 into channel 60 to interlock with the open grillwork mesh flooring to hold it firmly in place.

An access opening 180 is provided in a side of bin 168 to allow an animal to feed and downwardly depending flange 178 is included spaced inwardly from the wall of bin 168 to limit the degree to which the animal can place its head within the feed bin and to prevent feed from forcing its way out of feed opening 180. The bin is first sterilized and prefilled with feed and is installed by sliding the confinement pen outwardly several inches and dropping the bin through opening 170. The grain feed remains in the bin and as an animal feeds from the feed area 180 in front of flange 178 the grain feed supply is replenished by gravity from the source stored in bin 168.

In addition, suitable lighting is provided within the structure, for example by fluorescent bulbs 182 disposed along side plates 86 within the plenum 89. The lights are turned on as the individual vessels 112 are filled with formula to stimulate the animals for feeding and are turned off after feeding to quiet the animals in non-feeding times.

Thus the present invention provides a healthful, natural and sanitary incubative animal confinement system where young animals can be confined in a controlled environment and supplied with a proper feed formulation in a predetermined volumetric quantity and where the animals can feed at will. The structure is easy to maintain and the individual pens can be supplied with clean warm air to minimize contamination between separate confinement pens. Pen sizes can be flexibly controlled to take advantage of litter groupings if desired in later stages of the incubation period and the individual pens can be cleaned and sterilized without disturbing animals in adjacent pens.

What is claimed is:

1. An incubative animal confinement system comprising:
   a supporting structure,
   a plurality of modular individual animal confinement pens slidably mounted within said supporting structure,
   each said modular confinement pen including independently variable means for dispensing a predetermined volume of a liquid feed mixture through a nipple means accessible from within each said pen on demand of the animal confined therein, each said modular confinement pen including means to collect and remove waste products of the animal confined therein, and means operatively associated with said structure and each said modular confinement pen to control the temperature within each said pen and to circulate filtered air independently through each pen.

2. An incubative animal confinement system as defined in claim 1 wherein said plurality of individual confinement pens are arranged in said supporting structure in at least a pair of longitudinally extending rows and at least two vertically spaced tiers of said pair of longitudinally extending rows are provided.

3. An incubative confinement system as defined in claim 1 wherein said means for automatically dispensing a predetermined volume of liquid feed to each said confinement pen comprises a central storage vat, a manifold system communicating with said storage vat and distribution lines extending from said manifold system to each of a plurality of liquid feed holding systems adjacent each said confinement pen, each said liquid feed holding systems including means to vary the volume of liquid feed held therein and fluid communication lines extending from each holding system to a nipple assembly within each confinement pen whereby an animal confined therein can feed on demand from the predetermined supply of liquid feed retained in said holding system.

4. An incubative system as defined in claim 3 wherein each said liquid feed holding system comprises a liquid feed storage vessel and a plug cooperatively retained within said vessel and spaced from the bottom wall of said vessel, said vessel being movable with respect to said plug thereby to vary predeterminedly a liquid storage volume, a liquid distribution line extending through said plug and through an access opening in the bottom wall of said vessel, said distribution line affording fluid communication between said manifold system and said nipple assembly, an access opening within said fluid distribution line located to be in communication with said liquid storage volume whereby liquid feed from said manifold system is dispensed within said predetermined liquid storage volume and means within said liquid feed holding system to limit the volume of liquid feed dispensed from said storage vat to the predetermined volume.

5. An incubative confinement system as defined in claim 3 wherein said means within said liquid feed holding system to limit the volume of liquid feed dispensed comprises an air access bore through said plug affording communication between ambient air and said liquid storage volume, a floatation member confined within said air access bore to effectively block the air access bore when liquid feed is dispensed to the maximum capacity of said liquid storage volume thereby to effectively shut off the dispensing of liquid feed from said central storage vat.

6. An incubative animal confinement system as defined in claim 3 including means within said liquid feed distribution system to sterilize said liquid feed.

7. An incubative animal confinement system comprising:

a supporting structure comprising a plurality of spaced vertically disposed support legs interconnected by a plurality of lateral and longitudinal cross-brace members to define a rigid framework, a plurality of modular individual animal confinement pens slidably mounted within said supporting structure, each said modular confinement pen comprising a base plate member, a pair of upstanding side walls interconnected by a top wall member and one end wall member cooperatively joined to said other wall members to define an animal confinement enclosure, each said confinement pen being slidably disposed along cooperating lateral cross-brace members and being arranged contiguous to a next adjacent confinement pen and when one of said confinement pens is slidably withdrawn from said structure access to said confinement pen is provided, each said modular confinement pen including means for dispensing a predetermined volume of a liquid feed mixture on demand of the animal confined therein, each said modular confinement pen including means to collect and remove waste products of the animal confined therein, and means operatively associated with said structure and each said modular confinement pen to control the temperature within each said pen and to circulate filtered air independently through each pen.

8. An incubative animal confinement system as defined in claim 7 wherein said base plate member in each said confinement pen includes a floor plate of an open-mesh grill work construction to permit animal waste products to fall therethrough.

9. An incubative animal system as defined in claim 8 including collecting trough means mounted in said support structure beneath said plurality of modular confinement pens to collect animal waste products which fall through said floor plate members, said trough means being provided with a collecting pan inclined toward a runoff trough.

10. an incubative animal confinement system as defined in claim 7 wherein said end wall member in each said modular confinement pen is slidably disposed within said pen and is removable therefrom thereby to vary the size of the confinement pens.

11. An incubative animal confinement system comprising:

a supporting structure, a plurality of modular individual animal confinement pens slidably mounted within said supporting structure, each said modular confinement pen comprising a base plate member, a pair of upstanding side walls interconnected by a top wall member and one end wall member cooperatively joined to said other wall members to define an animal confinement enclosure, said individual pens being arranged in rows adjacent one another so that the end wall of a first confinement pen is the common end wall between the next adjacent confinement pen, each said modular confinement pen including means for dispensing a predetermined volume of a liquid feed mixture on demand of the animal confined therein, each said modular confinement pen including means to collect and remove waste products of the animal confined therein, and means operatively associated with said structure and each said modular confinement pen to control the temperature within each said pen and to circulate filtered air independently through each pen.

12. An incubative animal confinement system as defined in claim 11 wherein said means to control the temperature within each said pen includes electrical resistance heating wiring embedded within each said end wall member adapted to be responsive to thermostatic control means to maintain said confinement pens at a predetermined temperature level.

13. An incubative animal confinement system as defined in claim 11 wherein the top wall member of each said confinement pen is provided with air access passages therethrough and said supporting structure includes means defining an air plenum above each said tier of confinement pens and an air inlet duct communicating with said plenum mounted at one end of said structure and fan means to draw air into said plenum for circulation through said confinement pens.

* * * * *